United States Patent
Zhong et al.

(10) Patent No.: US 10,443,284 B2
(45) Date of Patent: Oct. 15, 2019

(54) FRICTION HINGE WITH RESTRICTED MOTION IN ONE DIRECTION

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hui-Yue Zhong, Shenzhen (CN); Hao-Yuan Huang, New Taipei (TW); Bin Liu, Shenzhen (CN); Jin-Yang Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 33 days.

(21) Appl. No.: 15/835,483

(22) Filed: Dec. 8, 2017

(65) Prior Publication Data
US 2019/0153761 A1    May 23, 2019

(30) Foreign Application Priority Data
Nov. 20, 2017  (CN) .......................... 2017 1 1160775

(51) Int. Cl.
*E05D 11/10* (2006.01)
*E05F 3/14* (2006.01)
(Continued)

(52) U.S. Cl.
CPC .................. *E05F 3/14* (2013.01); *E05D 3/02* (2013.01); *E05D 11/08* (2013.01); *F16C 11/103* (2013.01);
(Continued)

(58) Field of Classification Search
CPC ....... E05D 11/06; E05D 11/08; E05D 11/082; E05D 11/084; E05D 11/10; E05D 11/105; E05D 11/1064; E05D 2011/1035; E05D 3/02; E05Y 2201/638; E05Y 2201/254; E05Y 2201/256; E05Y 2800/298; E05Y 2900/132; E05Y 2900/134; E05Y 2900/20; E05Y 2900/31; E05Y 2900/312; E05Y 2900/614; E05F 3/14; E05F 3/16;
(Continued)

(56) References Cited

U.S. PATENT DOCUMENTS 685,403 A * 10/1901 Hughes ..................... E05F 3/20
16/49
1,176,014 A * 3/1916 Wyeth et al. ............. E05F 3/20
16/49
(Continued)

*Primary Examiner* — Chuck Y Mah
(74) *Attorney, Agent, or Firm* — ScienBiziP, P.C.

(57) ABSTRACT

A friction hinge with its motion restricted in one pivoting direction includes a support member, a restricting module, and a pivot member. The restricting module is mounted on the support member. The restricting module has an air flow opening. The pivot member is pivotable relative to the support member and the restricting module. A regulating chamber is defined between the pivot member and the restricting module. When the pivot member is pivoted in one direction, a pressure in the regulating chamber is increased and the restricting module is actuated to reduce size of the air flow opening, increasing the resistance to pivoting of the pivot member in this pivoting direction.

16 Claims, 7 Drawing Sheets

(51) Int. Cl.
*F16C 11/10* (2006.01)
*E05D 3/02* (2006.01)
*E05D 11/08* (2006.01)

(52) U.S. Cl.
CPC ... *E05Y 2201/254* (2013.01); *E05Y 2900/134* (2013.01); *E05Y 2900/20* (2013.01); *E05Y 2900/31* (2013.01); *E05Y 2900/614* (2013.01)

(58) Field of Classification Search
CPC ...... E05F 3/20; F16C 11/103; Y10T 16/5345; Y10T 16/54038; Y10T 16/54028
See application file for complete search history.

(56) References Cited

U.S. PATENT DOCUMENTS

| | | | | |
|---|---|---|---|---|
| 1,701,022 A * | 2/1929 | Thornton | ............... | E05F 3/20 16/54 |
| 2,490,258 A * | 12/1949 | Diebel | ............... | E05F 3/20 16/54 |
| 3,952,365 A * | 4/1976 | Grisebach | ............... | E02F 9/006 16/52 |
| 4,280,599 A * | 7/1981 | Bardfeld | ............... | E05F 3/14 16/58 |
| 5,193,228 A * | 3/1993 | Murasawa | ............... | A47K 13/10 4/236 |
| 5,390,770 A * | 2/1995 | Miyahara | ............... | A47K 13/10 188/276 |
| 5,664,286 A * | 9/1997 | Sorimachi | ............... | A47K 13/12 16/54 |
| 5,867,866 A * | 2/1999 | Chen | ............... | E05F 3/20 16/50 |
| 5,996,132 A * | 12/1999 | Sorimachi | ............... | A47K 13/12 16/303 |
| 6,840,355 B2 * | 1/2005 | Iwashita | ............... | A47K 13/10 188/290 |
| 7,204,354 B2 * | 4/2007 | Tomonaga | ............... | F16F 9/145 188/308 |
| 7,850,219 B2 * | 12/2010 | Townson | ............... | E05D 11/084 296/50 |
| 7,966,693 B2 * | 6/2011 | Choi | ............... | E05F 3/20 16/284 |
| 8,099,832 B1 * | 1/2012 | Shuker | ............... | E05D 11/1071 16/319 |
| 8,510,911 B2 * | 8/2013 | Sawa | ............... | E05F 1/1223 16/310 |
| 8,516,657 B2 * | 8/2013 | Yoshida | ............... | A47K 13/12 16/50 |
| 9,027,979 B2 * | 5/2015 | Ozaki | ............... | E05F 5/025 296/50 |
| 9,926,732 B2 * | 3/2018 | Bacchetti | ............... | E05D 3/02 |
| 2008/0010778 A1 * | 1/2008 | Tse | ............... | A47J 36/12 16/82 |
| 2018/0230725 A1 * | 8/2018 | Vinoth Kannan | .... | E05D 11/082 |

* cited by examiner

US 10,443,284 B2

FRICTION HINGE WITH RESTRICTED MOTION IN ONE DIRECTION

CROSS REFERENCE TO RELATED APPLICATION

This application claims priority to Chinese Patent Application No. 201711160775.5, filed on Nov. 20, 2017, the disclosure of which is incorporated herein by reference in its entirety.

FIELD

The present disclosure relates generally to friction hinges, and more particularly to a friction hinge with restricted motion in one direction.

BACKGROUND

A friction hinge is a hinge that provides frictional engagement between two objects, allowing any rotation angle between them. In order to meet the needs of the market there have been developed many types of friction hinges. However, at present there is no friction hinge with resistance in only one pivoting direction, that is, such a friction hinge can be pivoted in one direction without resistance and produce a resistance when being pivoted in the other direction.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
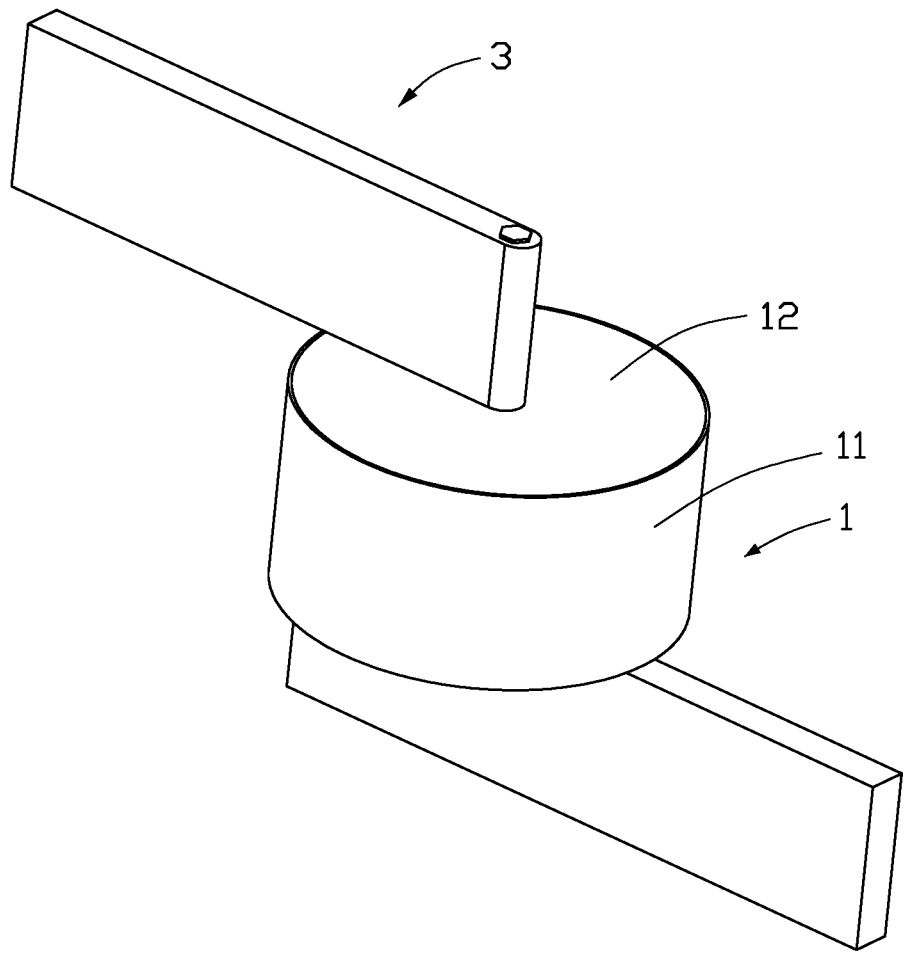
FIG. 1 is a perspective view of a friction hinge showing a pivot member in a resting position.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Figure 2:
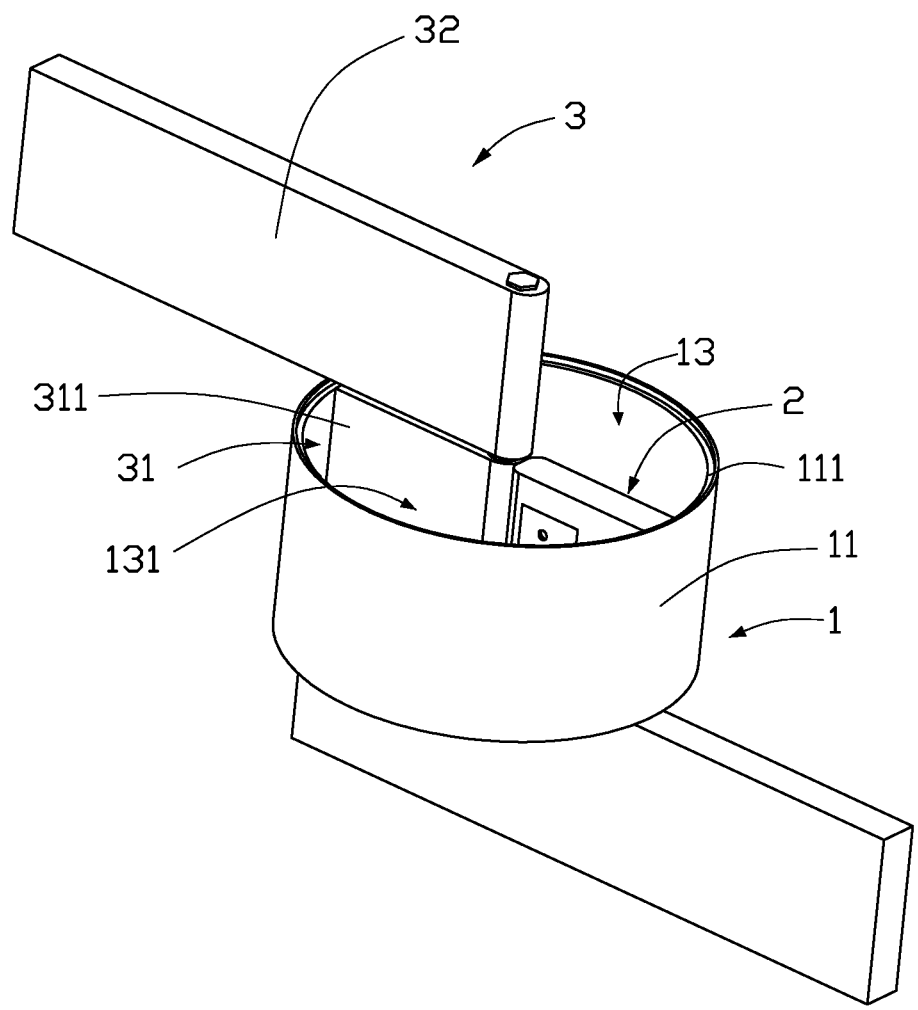
FIG. 2 is a perspective view of the friction hinge of FIG. 1 without a cover plate.
Figure 3:
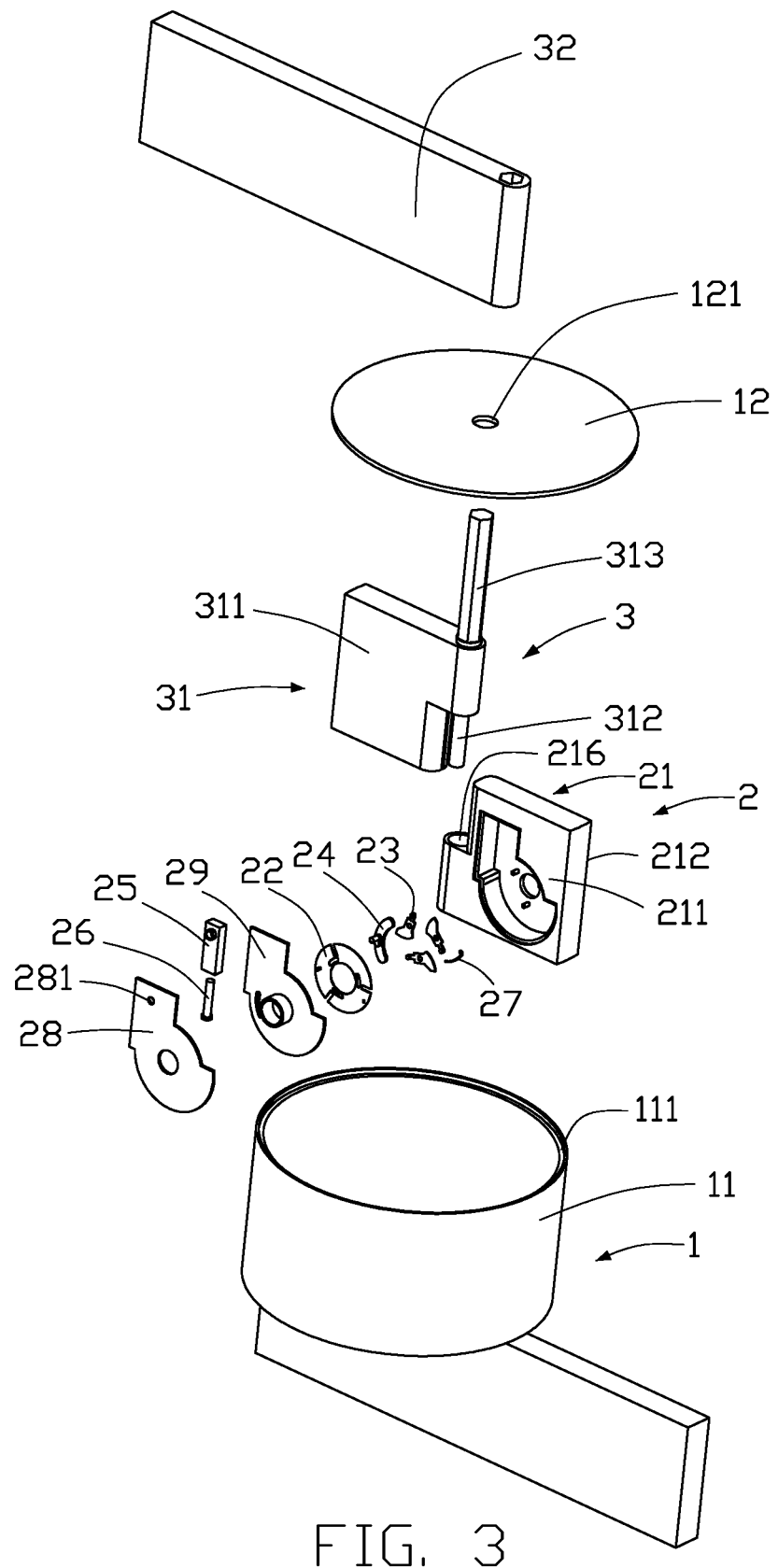
FIG. 3 is an exploded perspective view of the friction hinge of FIG. 1.

With reference to FIGS. 1-3, an exemplary embodiment of a friction hinge which can be used in various articles such as toilet seats, refrigerator doors, cabinet doors, fire doors, windows, and the like. The friction hinge includes a support member 1, a restricting module 2, and a pivot member 3.

The support member 1 includes a barrel 11 and a cover plate 12. The barrel 11 has an upper opening 111. The cover plate 12 covers the upper opening 111 of the barrel 11. The cover plate 12 has a shaft hole 121.

Figure 4:
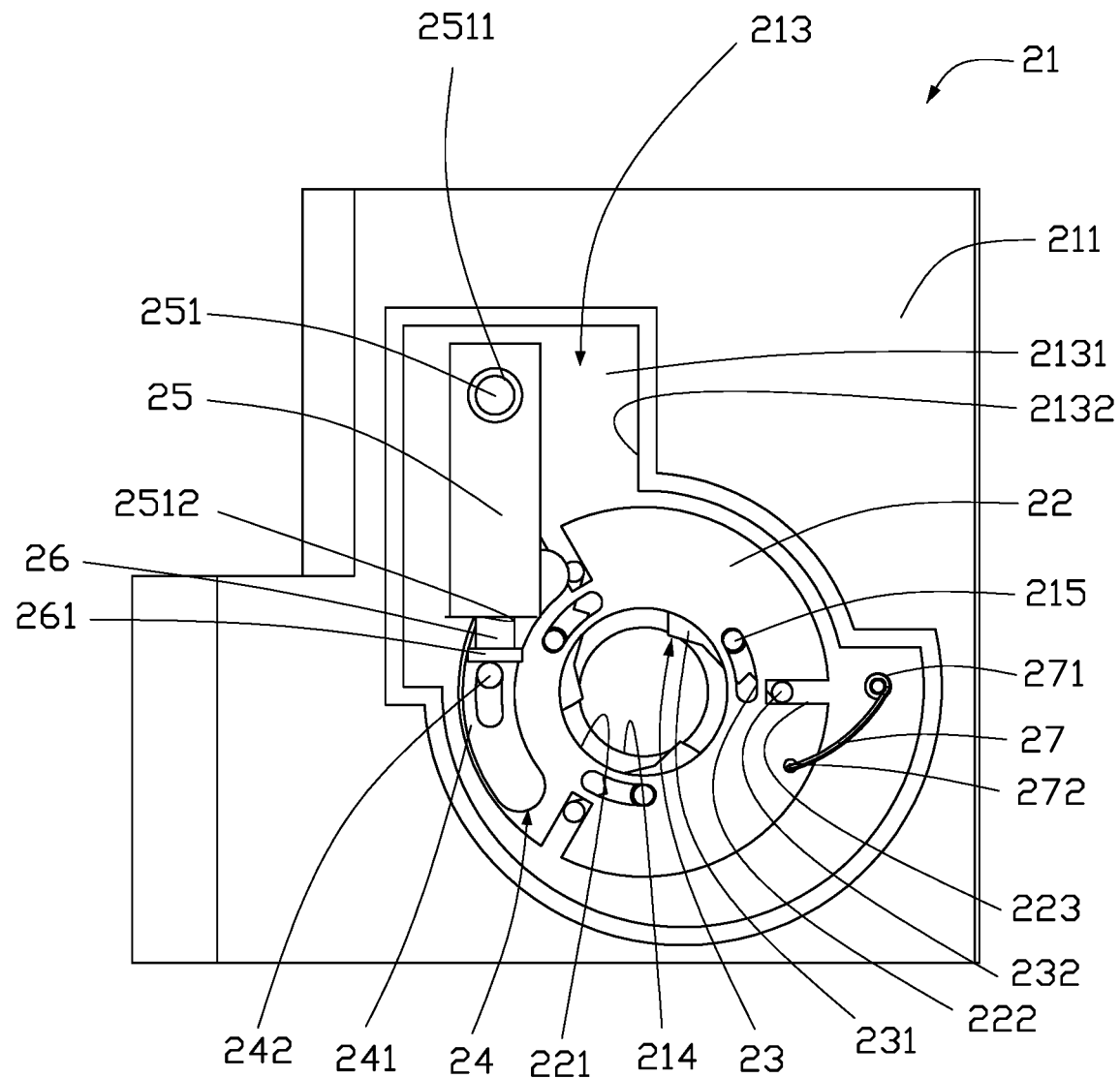
FIG. 4 is a partial front view of a restricting module of the friction hinge of FIG. 1.

The restricting module 2 is mounted on the support member 1. With reference to FIGS. 3 and 4, the restricting module 2 includes a mounting base 21, a control plate 22, at least one valve 23, a push block 24, a cylinder 25, a piston rod 26, a return spring 27, a protective panel 28, and a mounting panel 29.

The mounting base 21 is secured to the barrel 11 of the support member 1. The mounting base 21 has a front surface 211, a rear surface 212, a mounting recess 213, an air flow opening 214, at least one post 215, and a pivot hole 216. The mounting recess 213 is formed in the front surface 211. The mounting recess 213 has a recess surface 2131 and a recess opening 2132. The air flow opening 214 communicates with the mounting recess 213. The post 215 extends from the recess surface 2131 of the mounting recess 213 adjacent to the air flow opening 214. The pivot hole 216 is formed in one side of the mounting base 21. The control plate 22 is rotatably mounted in the mounting recess 213 of the mounting base 21. The control plate 22 is annular and has a central hole 221, at least one curved hole 222, and at least one radial hole 223. The central hole 221 is aligned with the air flow opening 214 of the mounting base 21. The curved hole 222 is adjacent to the central hole 221. The post 215 of the mounting base 21 extends through the curved hole 222 and thereby locates the control plate 22 on the mounting base 21. The radial hole 223 is adjacent to the curved hole 222. The valve 23 is movably mounted between the mounting base 21 and the control plate 22. The valve 23 has a valve body 231 and a pin 232. The pin 232 extends from the valve body 231. The pin 232 is inserted in the radial hole 223 of the control plate 22. The control plate 22 can be rotated clockwise to move the valve 23 away from the air flow opening 214 of the mounting base 21, or can be rotated counterclockwise to move the valve 23 to protrude into the air flow opening 214 of the mounting base 21. Thus, size of the air flow opening 214 can be varied. The push block 24 has a push body 241 and a push rod 242. The push block 24 is secured through the push body 241 to the control plate 22. The push rod 242 extends from the push body 241. The cylinder 25 is secured in the mounting recess 213 of the mounting base 21 adjacent to the push block 24. The cylinder 25 defines an interior chamber 215. The interior chamber 215 has a front open end 2511 and a lower open end 2152. The piston rod 26 is slidably disposed in the interior chamber 251 of the cylinder 25. The piston rod 26 has a lower portion 261 protruding from the lower open end 2512 of the interior chamber 215 of the cylinder 25 and the lower portion 261 abuts the push rod 242 of the push block 24. The return spring 27 has two ends, one end is attached to the recess surface 2131 of the mounting recess 213 of the mounting base 21 adjacent to the control plate 22, and the other end is attached to the control plate 22. The protective panel 28 covers the recess opening 2132 of the mounting recess 213 of the mounting base 21. The protective panel 28 has an aperture 281 aligned with the front open end 2511 of the interior chamber 251 of the cylinder 25. The mounting panel 29 is disposed between the control plate 22 and the protective panel 28.

In a preferred exemplary embodiment, the restricting module 2 includes three valves 23. The mounting base 21 has three posts 215, and the control plate 22 has three curved holes 222 and three radial holes 223.

With reference to FIGS. 2 and 3, the pivot member 3 is pivotable relative to the support member 1 and the restricting module 2. The pivot member 3 includes a pivot base 31 and a control panel 32. The pivot base 31 is pivotally mounted on the restricting module 2. The pivot base 31 has a pivot panel 311, a pivot shaft 312, and a connection shaft 313. The pivot shaft 312 is located at one side of the pivot panel 311. The pivot shaft 312 is inserted into the pivot hole 216 of the mounting base 21 of the restricting module 2. The connection shaft 313 extends from a top surface of the pivot panel 311. The connection shaft 313 passes through the shaft hole 121 of the cover plate 12 of the support member 1 and protrudes from an upper surface of the cover plate 12. A volume 13 is defined between the barrel 11 and the cover plate 12 of the support member 1, and the volume 13 defines a regulating chamber 131 between the pivot panel 311 and the front surface 211 of the mounting base 21. The regulating chamber 131 communicates with the interior chamber 251 of the cylinder 25 through the aperture 281 of the protective panel 28 and the front open end 2511 of the interior chamber 251 of the cylinder 25. The control panel 32 is secured to the connection shaft 313 of the pivot base 31.

Figure 5:
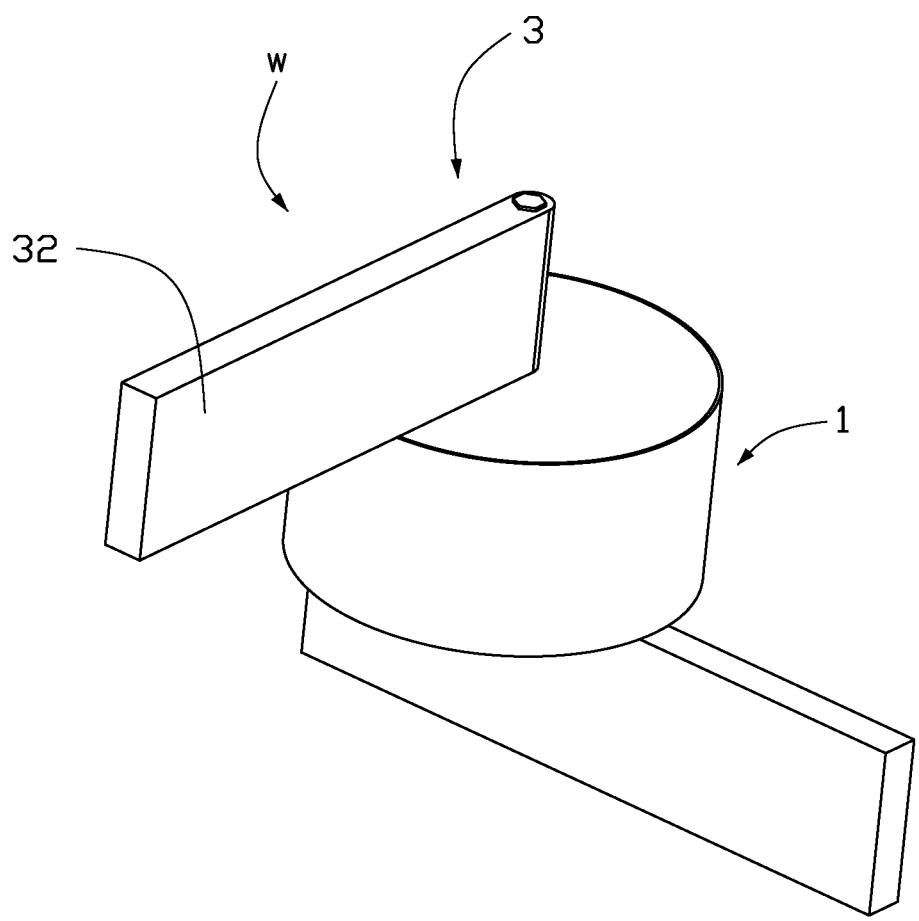
FIG. 5 is a perspective view of the friction hinge of FIG. 1 showing the pivot member pivoted.
Figure 6:
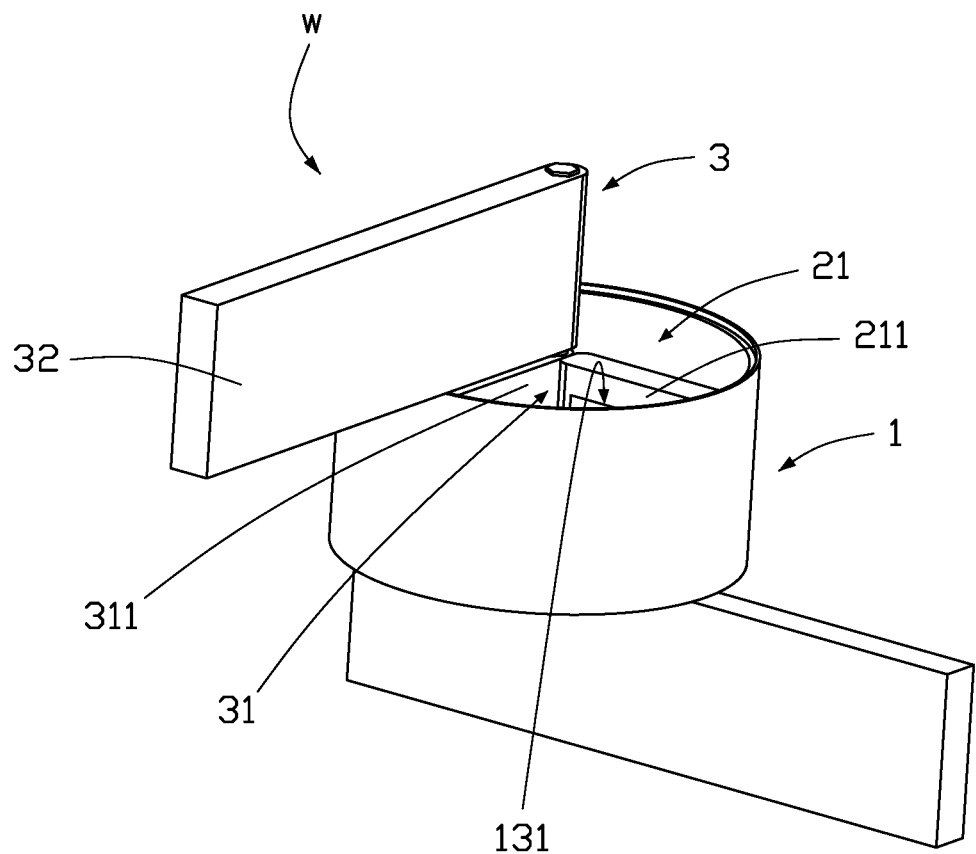
FIG. 6 is a perspective view of the friction hinge of FIG. 5 without the cover plate.
Figure 7:
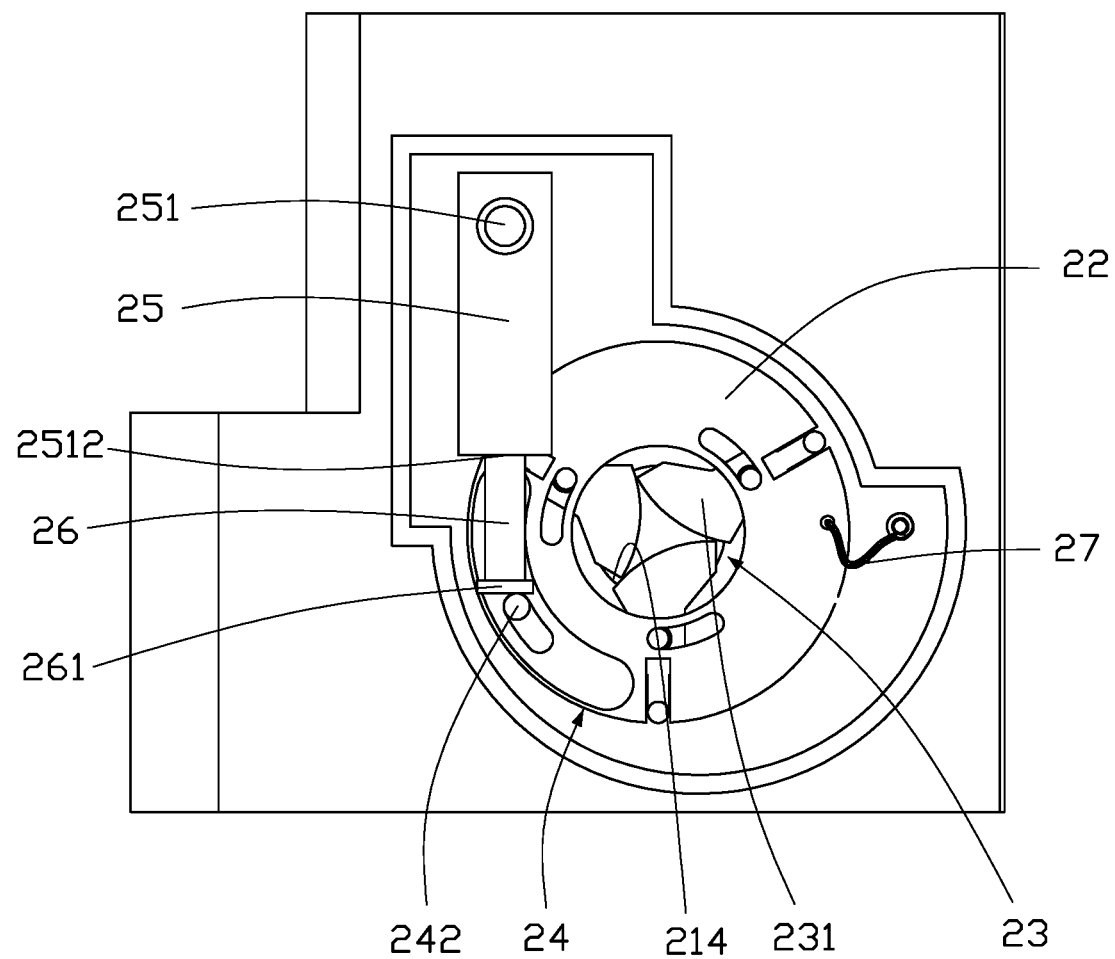
FIG. 7 is a partial front view of the restricting module of the friction hinge of FIG. 5.

When the control panel 32 is pivoted to rotate the pivot base 31 in a clockwise direction toward the rear surface 212 of the mounting base 21, the pivoting member 3 can be pivoted without resistance. With reference to FIGS. 5 and 6, when the control panel 32 is pivoted to rotate the pivot base 31 in a counterclockwise direction toward the front surface 211 of the mounting base 21 (indicated by the arrow W in FIGS. 5 and 6), a pressure in the regulating chamber 131 between the pivot panel 311 of the pivot seat 31 and the front surface 211 of the mounting base 21 is increased. With further reference to FIG. 7, the piston rod 26 moves toward the lower open end 2512 of the interior chamber 215 of the cylinder 25 and the lower portion 261 of the piston rod 26 pushes against the push rod 242 of the push block 24, such that the control plate 22 rotates counterclockwise. The control plate 22 thus moves the valve 23 and the valve body 231 of the valve 23 to protrude into the air flow opening 214 of the mounting base 21. The size of the air flow opening 214 becomes less, restricting the air flow, and the pressure in the regulating chamber 131 continues to increase, thereby gradually increasing the resistance to pivoting of the pivot panel 311 of the pivot base 31. The return spring 27 is thereby compressed. When the control panel 32 is released, the return spring 27 provides a return force to the control plate 22 such that the control plate 22 rotates clockwise to return to its original position and again move the valve 23. With reference to FIG. 4, the valve 23 returns to its original position so as to not protrude into the air flow opening 214 of the mounting base 21. The size of the air flow opening 214 is restored to its original unrestricted size.

The exemplary embodiments shown and described above are only examples. Many details are often found in the art such as the other features of a friction hinge. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A friction hinge with restricted motion in one direction comprising:
   a support member;
   a restricting module mounted on the support member, and the restricting module having an air flow opening; and
   a pivot member having a pivot shaft and pivotable relative to the support member and the restricting module, and a regulating chamber defined between the pivot member and the restricting module;
   wherein the restricting module comprises:
     a mounting base secured within the support member, and the mounting base having the air flow opening and a pivot hole on a side of the mounting base;
     a control plate rotatably mounted on the mounting base;
     at least one valve movably mounted between the mounting base and the control plate;
     a push block secured to the control plate;
     a cylinder mounted on the mounting base adjacent to the push block, and the cylinder defining an interior chamber; and
     a piston rod slidably disposed in the interior chamber of the cylinder;
   wherein the pivot shaft is inserted in the pivot hole of the mounting base thereby the pivot member being pivotally mounted on the side of the mounting base, the regulating chamber is defined between the pivot member and the mounting base, and the regulating chamber communicates with the interior chamber of the cylinder;
   wherein the control plate is rotated in one direction to move the valve away from the air flow opening of the mounting base, and the control plate is rotated in the other direction to move the valve to protrude into the air flow opening of the mounting base; and
   wherein when the pivot member is pivoted to increase the pressure in the regulating chamber, the piston rod moves to push the push block such that the control plate is rotated to move the valve to protrude into the air flow opening of the mounting base and reduce size of the air flow opening.

2. The friction hinge of claim 1, wherein the mounting base has at least one post, the control plate has at least one curved hole, and the post of the mounting base extends through the curved hole and thereby locates the control plate on the mounting base.

3. The friction hinge of claim 2, wherein the interior chamber of the cylinder has a front open end and a lower open end, the piston rod has a lower portion protruding from the lower open end of the interior chamber of the cylinder, the lower portion abuts the push block, and the regulating chamber communicates with the interior chamber of the cylinder through the front open end of the interior chamber of the cylinder.

4. The friction hinge of claim 2, wherein the restricting module comprises a return spring having two ends, one end being attached to the mounting base, and the other end being attached to the control plate.

5. The friction hinge of claim 2, wherein the mounting base has a mounting recess having a recess opening, the air flow opening communicates with the mounting recess, the control plate is rotatably mounted in the mounting recess, the cylinder is secured in the mounting recess, the restricting module comprises a protective panel covering the recess opening of the mounting recess.

6. The friction hinge of claim 2,
wherein the support member comprises:
   a barrel having an upper opening; and
   a cover plate covering the upper opening of the barrel; and
wherein the mounting base is secured to the barrel of the support member.

7. The friction hinge of claim 6,
wherein the cover plate has a shaft hole; and
wherein the pivot member has a pivot base, the pivot base has:
   a pivot panel pivotally mounted on the side of the mounting base, and the regulating chamber is defined between the pivot panel and the mounting base; and
   a connection shaft extending from a top surface of the pivot panel, and passing through the shaft hole of the cover plate and protruding from an upper surface of the cover plate.

8. The friction hinge of claim 1, wherein the control plate has at least one radial hole, and each of the at least one valve has a pin inserted in a corresponding radial hole of the control plate.

9. The friction hinge of claim 8, wherein the interior chamber of the cylinder has a front open end and a lower open end, the piston rod has a lower portion protruding from the lower open end of the interior chamber of the cylinder, the lower portion abuts the push block, and the regulating chamber communicates with the interior chamber of the cylinder through the front open end of the interior chamber of the cylinder.

10. The friction hinge of claim 8, wherein the restricting module comprises a return spring having two ends, one end being attached to the mounting base, and the other end being attached to the control plate.

11. The friction hinge of claim 8, wherein the mounting base has a mounting recess having a recess opening, the air flow opening communicates with the mounting recess, the control plate is rotatably mounted in the mounting recess, the cylinder is secured in the mounting recess, the restricting module comprises a protective panel covering the recess opening of the mounting recess.

12. The friction hinge of claim 1, wherein the interior chamber of the cylinder has a front open end and a lower open end, the piston rod has a lower portion protruding from the lower open end of the interior chamber of the cylinder, the lower portion abuts the push block, and the regulating chamber communicates with the interior chamber of the cylinder through the front open end of the interior chamber of the cylinder.

13. The friction hinge of claim 1, wherein the restricting module comprises a return spring having two ends, one end being attached to the mounting base, and the other end being attached to the control plate.

14. The friction hinge of claim 1, wherein the mounting base has a mounting recess having a recess opening, the air flow opening communicates with the mounting recess, the control plate is rotatably mounted in the mounting recess, the cylinder is secured in the mounting recess, the restricting module comprises a protective panel covering the recess opening of the mounting recess.

15. The friction hinge of claim 1,
wherein the support member comprises:
   a barrel having an upper opening; and
   a cover plate covering the upper opening of the barrel; and
wherein the mounting base is secured to the barrel of the support member.

16. The friction hinge of claim 15,
wherein the cover plate has a shaft hole; and
wherein the pivot member has a pivot base, the pivot base has:
   a pivot panel pivotally mounted on the side of the mounting base, and the regulating chamber is defined between the pivot panel and the mounting base; and
   a connection shaft extending from a top surface of the pivot panel, and passing through the shaft hole of the cover plate and protruding from an upper surface of the cover plate.

* * * * *